United States Patent
Koch et al.

(10) Patent No.: US 6,207,300 B1
(45) Date of Patent: Mar. 27, 2001

(54) SOLDERING PASTE FOR PRODUCING GEOMETRICAL METAL STRUCTURES WITH PRECISE CONTOURS

(75) Inventors: Jürgen Koch, Mühlheim; Manfred Koschlig, Aschaffenburg; Harald Krappitz, Hanau; Wolfgang Weber, Karlstein; Klaus Lönne, Burscheid; Klaus Schmitt, Grünebach, all of (DE)

(73) Assignees: Federal-Mogul Sealing Systems GmbH, Herdorf; Degussa-Hüls Aktiengesellschaft, Frankfurt, both of (DE)

( * ) Notice: Subject to any disclaimer, the term of this patent is extended or adjusted under 35 U.S.C. 154(b) by 0 days.

(21) Appl. No.: 09/381,269

(22) PCT Filed: Mar. 17, 1998

(86) PCT No.: PCT/EP98/01530

§ 371 Date: Dec. 8, 1999

§ 102(e) Date: Dec. 8, 1999

(87) PCT Pub. No.: WO98/42476

PCT Pub. Date: Oct. 1, 1998

(30) Foreign Application Priority Data

Mar. 20, 1997 (DE) .............................................. 197 11 562

(51) Int. Cl.$^7$ ...................................................... B05D 1/32
(52) U.S. Cl. ..................... 428/680; 427/229; 427/282; 427/287; 427/383.7
(58) Field of Search .................................. 427/287, 282, 427/229, 190, 191, 199, 201, 383.7; 420/452, 442, 459; 428/680

(56) References Cited

U.S. PATENT DOCUMENTS

| | | | |
|---|---|---|---|
| 3,684,533 | 8/1972 | Conwicke | 106/1 |
| 4,606,495 | 8/1986 | Stewart, Jr. et al. | 228/183 |
| 4,919,730 | 4/1990 | Mizuhara | 148/24 |
| 4,924,033 | 5/1990 | Iyogi et al. | 174/259 |
| 5,354,578 | 10/1994 | Beyer et al. | 427/190 |
| 5,431,745 | 7/1995 | Koschlig et al. | 148/24 |
| 5,496,391 | 3/1996 | Noel | 75/255 |
| 5,561,827 | 10/1996 | Reeves et al. | 419/5 |

FOREIGN PATENT DOCUMENTS

| | | |
|---|---|---|
| 373939 | 1/1964 | (CH) . |
| 374530 | 2/1964 | (CH) . |
| 30 18 007 | 11/1981 | (DE) . |
| 41 31 871 C1 | 5/1992 | (DE) . |
| 43 15 475 | 11/1994 | (DE) . |
| 44 40 503 | 3/1996 | (DE) . |
| 195 28 031 | 2/1997 | (DE) . |
| 0 331 500 | 9/1996 | (EP) . |
| WO 94/13426 | 6/1994 | (WO) . |

OTHER PUBLICATIONS

S.K. Tung, et al., "Void Formation in Wide Gap Brazing Using Prepacks of Nickel Base Braze Mixes," *Materials Science and Technology*, May 1994, vol. 10, p. 364.

Primary Examiner—Shrive Beck
Assistant Examiner—Kristen A. Crockford
(74) Attorney, Agent, or Firm—Smith, Gambrell & Russell, LLP

(57) ABSTRACT

A process for producing, on a metallic substrate, a geometric metal structure having a precise contour, including the steps of: solder coating a solder paste onto the substrate by screen printing to create the geometric metal structure, the solder paste comprising an organic binder system, and 80 to 95 weight % of a mixture of a nickel-based solder and a pulverulent alloy of nickel with at least one member selected from the group consisting of chromium, molybdenum, tungsten, manganese and iron, provided as a higher-melting metallic filler, wherein a weight ratio of solder to filler is 2–6:1, an average grain size of the solder is between 10 and 50 $\mu$m, and a grain size ratio of solder to filler, relative to the average grain size is from 0.5–2.5:1; drying the structure; decomposing the organic binder system present in the solder paste, without leaving a reside, by a heat treatment; and raising the temperature until the resulting solder material liquifies.

15 Claims, No Drawings

SOLDERING PASTE FOR PRODUCING GEOMETRICAL METAL STRUCTURES WITH PRECISE CONTOURS

This invention relates to a solder paste for the production of geometric metal structures having precise contours on metallic substrates by solder coating.

Solder pastes have long been used in the prior art for providing a material bond between various materials. Depending upon the base material and particular application, various solder alloys in powder form are bound for this purpose with an organic binder as the matrix material and applied onto the workpieces to be joined in the form of a pasty composition. Application may, for example, be performed here, depending upon the requirement for uniformity and thickness of the layer, by dispensing, screen printing, dipping or spraying. On subsequent heat treatment, the organic binder is completely combusted and, once the solder forms a liquid melt phase, it creates a material bond between the workpieces. Wetting of the base materials by the liquid solder may be promoted by the addition of fluxes to the solder paste.

The same method may be used for providing a materially bonded surface coating on an individual workpiece surface. A uniform layer of solder may be produced on the base material by so-called solder coating. This technique is preferably used if the base material is to be protected from harmful environmental effects, such as when tinning copper, steel or brass sheet to provide corrosion protection, when coating turbine blades to prevent abrasive wear. The solder used for coating may here be applied either in the molten state (for example solder baths, drag soldering, flame spraying etc.) or be applied in the form of a suspension or solder paste. DE 43 15 475 A1 describes a solder suspension for applying thin solder layers on substrates. In this case, solder powders having a specific grain size distribution are suspended in an organic binder, applied onto the surfaces to be coated by dipping, spraying or brushing, and then soldered to the substrate. However, it is only possible to produce structures which are coarse or of a large area by dipping, brushing or spraying. Using known solder pastes, the viscosity and rheological properties of which have been specially adjusted, it is possible to apply micrometre magnitude structures having sharp contours for example by screen printing. However, during the subsequent fusion process, the contour, edge steepness and edge definition of the printed solder layer are lost, as, due to the wetting process, the liquid solder spreads out irreversibly on the surface of the base material. The extent of solder spreading is determined by the wettability of the base material and the surface tension of the molten solder. This behaviour is observed to a greater or lesser extent with all combinations of solder and base material. The flow behaviour of the solder once the liquidus temperature has been reached is especially undesirable when the screen printed solder layers with precise contours ought at most to shrink normal to the material surface during the soldering process, i.e. the reduction in the volume of the paste determined by combustion of the binder and the sintering and fusion process may only be discernible from a reduction in layer thickness, and spreading of the molten solder on the substrate beyond the predetermined limits of the structure must be excluded. One typical application is, for example, the application of spatially delimited spacers or thickened portions of a precisely defined height, which are materially bonded with metallic substrates. Such spacers or thickened portions produced by solder coating may find industrial application in the production of multi-ply steel seals. For this application, spatially delimited elevated portions having precise contours must be applied to the metal plies, ensuring reliable sealing in the multi-ply steel seal. DE 44 40 503 C1 and DE 195 28 031 describe single or multi-ply flat seals, which have spatially defined thickened rings to provide the sealing action, which rings are to be produced by sintering or fusion of solder material. These patents do not, however, reveal the composition of any screen-printable solder pastes usable for this purpose, nor the criteria which must be fulfilled in order permit the production of defined structures with precise contours using these pastes.

The object of the present invention was accordingly to provide a solder paste for the production of metallic structures with precise contours, which paste may be applied with sharp contours by screen printing onto a metallic substrate and precisely retains the two-dimensional extent of the predefined structure during the soldering process. Apart from this essential requirement of the solder paste, surface roughness, layer thickness and planarity of the resultant structures are of great significance for certain applications. This is especially the case if these layers must perform a sealing function, as in the case of multiply steel seals. In this case, the average surface roughness after the soldering process at a layer thickness of 25 to 250 µm must not exceed a limit value of 15 µm roughness height (mean roughness height $R_z$ to DIN 4768). The soldered structures must additionally retain stable contours up to maximum temperatures of 300° C., even under load and mechanical stress, which may only be achieved if the solder paste according to the invention leaves no pores or other deformable fractions in the layer after the soldering operation.

It has now been found that these requirements are fulfilled by a screen-printable solder paste which, in an organic binder system, contains 80 to 95 wt. % of a mixture of a nickel-based solder and a pulverulent alloy of nickel with one of the elements chromium, molybdenum, tungsten, manganese or iron as a higher-melting metallic filler, and which is characterised in that the weight ratio of solder to filler is 2–6:1, the average grain size of the solder is between 10 and 50 µm and the grain size ratio, relative to the average grain size, of solder to filler is 0.5–2.5:1.

The present invention accordingly provides a solder paste as characterised above for the production of geometric metal structures with precise contours.

The present invention furthermore provides the use of such a solder paste for the production of geometric metal structures with precise contours on metallic substrates by solder coating.

The present invention furthermore provides a process for the production of geometric metal structures with precise contours on metallic substrates by solder coating, wherein structures of such a solder paste are applied by screen printing onto the substrate, the structures are dried and the organic binder system present in the solder paste is decomposed without leaving residues in a subsequent heat treatment and the temperature is then raised until the solder material liquefies.

The solder paste according to the invention contains a pulverulent solder and a higher-melting pulverulent metallic filler in an organic binder system. The solder is a pulverulent, nickel-based solder having an average grain size of between 10 and 50 µm, preferably between 25 and 45 µm. Any nickel-based solders which melt within a range between 850 and 1100° C. are in principle suitable. Nickel-based solders are known to the person skilled in the art, who may straightforwardly select them in accordance with the requirements for the purpose according to the invention. The metallic filler is a pulverulent alloy of nickel with one of the elements chromium, molybdenum, tungsten, manganese or iron. According to the invention, the weight ratio of solder to filler is 2–6:1 and the grain size ratio, relative to the average grain size, is 0.5–2.5:1. The weight ratio is preferably 3.5–4.5:1 and the grain size ratio 1.0–2.0:1. The particles of the solder and filler powder should be largely of a spherical shape. Such metal powders with a spherical particle shape and a defined grain size may be produced using per se known processes, for example by spraying of suitable alloy melts and subsequent screening or classification. The filler alloys which may be considered generally have a melting point of above 1300° C. Nickel alloys suitable as filler are known to the person skilled in the art, who may straightforwardly select them in accordance with the requirements for the purpose according to the invention. Nickel/chromium alloys are preferably used as the filler. It has proved particularly advantageous with regard to the requirements for the production of spacers in multi-ply steel seals if the metallic component of the solder paste consists of a nickel-based alloy of the composition Ni82.4Cr7Fe3Si4.5B3.1 or Ni76Cr14P10 and a nickel/chromium alloy of the composition Ni80Cr20 as the filler.

The solder paste according to the invention is produced by initially vigorously mixing the solder powder and filler in the stated weight ratio and then dispersing this mixture in an organic binder system. Binder systems for the production of solder pastes are known per se. In order to achieve a screen-printable consistency of the paste, it is necessary for the paste to contain 80 to 95 wt. % of the metal powder mixture. The binder system may contain 1 to 15 wt. % of an organic binder, which is dissolved in an organic solvent. The binder system conventionally consists of a solution of a polymeric organic binder, for example from the class of polyacrylates, polyisobutylenes or cellulose derivatives, in an organic solvent with a relative evaporation rate of 1000 to 20000. Typical solvents are high-boiling aliphatic hydrocarbons, glycols, glycol ethers or higher-boiling alcohols. The kinematic viscosity of the solder paste is adjusted to the value required for screen printing of 10 to 50 Pa s by means of the total metal content. The printing behaviour of the solder paste may be controlled by the addition of rheologically active additives to the binder system, for example castor oil derivatives, such that, due to the thixotropic behaviour of the solder paste, the structures applied by screen printing do not run either when moist or during the drying stage.

The solder pastes according to the invention may, of course, contain further additives conventional in solder technology, such as for example fluxes, levelling auxiliaries etc.

By means of the selection according to the invention of grain size and mixing ratios, printable solder pastes are obtained with which crack- and pore-free structures with sharp contours may be produced by screen printing on metallic substrates. It is found that the solder paste wets the substrates effectively even when moist and, once dry, forms a firmly adhering layer without running. The base materials used, for example for application as a sealing material, are primarily 0.10 to 1.20 mm thick sheet plies of stainless steels 1.4301, 1.4016, 1.4512, as well as nickel plated cold rolled strip 1.0338 and heat-treatable stainless steels. Once the structures have been printed, the components are dried in an oven, for example for approx. 15 to 30 minutes at 120 to 180° C., and then, for example in a continuous furnace, soldered under a reducing atmosphere, for example under hydrogen, at 1050° C. to form a material bond with the substrate. The organic binder decomposes without leaving a residue during the heating process. The applied structures then fuse in the range from 850 to 1100° C. to yield a smooth layer without the solder running on the substrate.

It has surprisingly been found that, by using the solder paste according to the invention, structures with a precise contour may be produced by solder coating, wherein the structures with a sharp contour applied onto a metal substrate by screen printing also retain the precise contour of their two- or three-dimensional form and largely retain their edge definition during and after the soldering process.

Both the grain size and mixing ratios of the solder to filler have a decisive influence on the surface roughness and plane-parallelism of the layer produced by solder coating. It has been found that solder-coated structures having layer thicknesses of 25 to 250 $\mu$m and in particular of 50 to 150 $\mu$m having a roughness height (mean roughness height $R_z$ to DIN 4768) of no more than 15 $\mu$m and excellent plane-parallelism may be produced if the grain size and mixing ratio of solder to filler according to the invention is maintained.

Metallographic investigations of the resultant solder structures have surprisingly revealed that virtually none of the filler particles originally present in the solder paste are any longer there. Instead, newly formed, acicular crystal structures having an elemental composition differing from that of the original filler alloy are found embedded in the solder matrix. The higher-melting filler particles clearly alloy with the solder to form crystallite structures of a different composition.

Where the filler alloy is of the composition Ni80Cr20, acicular crystallites of the composition Ni20Cr80 are formed. It is assumed that this process is largely responsible for the formation of non-porous solder structures with sharp contours.

The following Examples are intended to illustrate the invention:

EXAMPLE 1

144 g of nickel-based solder L-Ni2 of the alloy composition Ni82.4Cr7Fe3Si4.5B3.1 having an average grain size of 35 $\mu$m are homogenised for 30 minutes in a tumble mixer with 36 g of Ni80Cr20 filler powder having an average grain size of 17 $\mu$m. The solder/filler mixing ratio is 4.0:1, the solder/filler grain size ratio is 2.0:1. The powder mixture is then vigorously stirred in a high-speed stirrer at 3000 rpm into 20 g of a binder consisting of 15% polyisobutylene, 1% thixotroping agent (Crayvallac SF), remainder light naphtha. Stirring is continued for a further 30 minutes to complete the dispersion. After cooling to room temperature, the viscosity is adjusted to 30 Pa.s by adding a thinner.

The paste is stable in storage for several months without separating. The paste is screen-printed (screen parameters: 21T, 150 $\mu$m mesh size) in a ring with sharp contours around a stamped sheet metal ply of 1.4301 stainless steel and dried for 15 minutes at 130° C. in a drying cabinet. Once dry, the layer adheres firmly to the substrate. The dry layer thickness of the crack- and pore-free ring structure is 125 $\mu$m, the width 2.5 mm. The component is then soldered under hydrogen at a peak temperature of 1050° C. The resultant layer thickness is determined at various points on the ring-shaped solder layer and is on average 86±10 $\mu$m. The roughness height $R_z$ is less than 10 $\mu$m, wherein the layer has a cross-sectional width, plane-parallel to the substrate, of 1.5 mm. The overall width remains unchanged at 2.5 mm.

EXAMPLE 2

63.75 g of nickel-based solder L-Ni2 of the alloy composition Ni82.4Cr7Fe3Si4.5B3.1 having an average grain size of 39 μm are homogenised for 30 minutes in a tumble mixer with 21.25 g of Ni80Cr20 filler powder having an average grain size of 32 μm. The solder/filler mixing ratio is 3.0:1, the solder/filler grain size ratio is 1.2:1. The powder mixture is then vigorously stirred with a conventional commercial dispersion unit at 3000 rpm into 15 g of a binder system consisting of a solution of 5 g of polybutyl methacrylate (molecular weight 110000 g/mol) and 1 g of Rheocin (castor oil derivative, C.H. Erbslöh) in 94 g of Texanol and, after 30 minutes' stirring, cooled to room temperature. The viscosity is adjusted to 18 Pa.s by adding Texanol.

The paste is screen-printed onto a nickel-plated cold rolled strip (1.0338) in the form of a 4.8 mm wide ring around a round stamping of 100 mm in diameter and dried at 150° C. The dry layer thickness before soldering is 61 μm, with a variation in thickness of ±3 μm. After soldering at 1050° C. in a continuous furnace under hydrogen, the layer thickness is 53 μm, roughness is 15 μm. Graphical evaluation of the cross-sectional contour plot through the soldered ring reveals a width, plane-parallel to the film surface, of 2.6 mm.

EXAMPLE 3

146 g of nickel-based solder L-Ni7 of the alloy composition Ni76Cr14P10 having an average grain size of 40 μm are vigorously mixed for 20 minutes in a tumble mixer with 34 g of Ni80Cr20 having an average grain size of 25 μm. The solder/filler mixing ratio is 4.3:1, the solder/filler grain size ratio is 1.6:1. The powder mixture is then vigorously stirred in a high-speed stirrer at 2500 rpm into 20 g of a binder consisting of a 1.5% solution of hydroxypropylcellulose in dipropylene glycol and dispersed for 15 minutes to complete the distribution. The temperature must not exceed 40° C. during this operation. After cooling to room temperature, the viscosity is adjusted to 25–30 Pa.s.

The paste is screen-printed onto a 1 mm thick stainless steel foil (1.4301) in a 5 mm wide ring around a round stamping of 100 mm in diameter and dried at 150° C. The dry layer thickness before soldering is 83 μm, with a variation in thickness of ±5 μm. After soldering at 1050° C. in a continuous furnace under hydrogen, the layer thickness is on average 70 μm, roughness is 12 μm. Graphical evaluation of the cross-sectional contour plot through the soldered ring reveals a width, plane-parallel to the film surface, of 3.1 mm.

What is claimed is:

1. A process for producing, on a metal substrate, a geometric metal structure having a precise contour, comprising solder coating onto the metal substrate a solder paste, to thereby form the geometric metal structure on the metal substrate, the solder paste comprising:
    an organic binder system; and
    80 to 95wt % of a mixture of a nickel-based solder and a pulverulent alloy of nickel with at least one member selected from the group consisting of chromium, molybdenum, tungsten, manganese and iron, provided as a higher-melting metallic filler,
    wherein a weight ratio of solder to filler is 2–6:1, an average grain size of the solder is between 10 and 50 μm, and a grain size ratio of solder to filler, relative to the average grain size, is from 0.5–2.5:1.

2. The process according to claim 1, wherein the soldered geometric metal structure produced exhibits a layer thickness of 25 to 250 μm, and a roughness height of no more than 15 μm.

3. A process for producing, on a metallic substrate, a geometric metal structure having a precise contour, comprising:
    solder coating a solder paste onto the substrate, by screen printing, to create the geometric metal structure, the solder paste comprising:
    an organic binder system, and
    80 to 95wt % of a mixture of a nickel-based solder and a pulverulent alloy of nickel with at least one member selected from the group consisting of chromium, molybdenum, tungsten, manganese and iron, provided as a higher-melting metallic filler, wherein a weight ratio of solder to filler is 2–6:1, an average grain size of the solder is between 10 and 50 μm, and a grain size ratio of solder to filler, relative to the average grain size, is from 0.5–2.5:1;
    drying the structure;
    decomposing the organic binder system present in the solder paste, without leaving a residue, by a heat treatment; and
    raising the temperature until the resulting solder material liquifies.

4. The process according to claim 3, wherein the temperature until the resulting solder material liquifies is between 850 and 1100° C.

5. The process according to claim 2, wherein the layer thickness is in the range from 50 to 150 μm.

6. The structure produced by the process according to claim 1.

7. The structure produced by the process according to claim 2.

8. The structure produced by the process according to claim 3.

9. The structure produced by the process according to claim 4.

10. The structure produced by the process according to claim 5.

11. The process according to claim 1, wherein the weight ratio of solder to filler is from 3.5–4.5:1.

12. The process according to claim 1, wherein the average grain size of the solder is from 25 to 45 μm.

13. The process according to claim 1, wherein the grain size ratio of solder to filler, relative to the average grain size, is from 1.0–2.0:1.

14. The process according to claim 1, wherein the filler comprises a nickel/chromium alloy.

15. The process according to claim 1, wherein the filler comprises a nickel-based solder having a composition of Ni82.4Cr7Fe3Si4.5B3.1 or Ni76Cr14P10; and the filler comprises a nickel/chromium alloy having a composition of Ni80Cr20.

* * * * *